T. W. NYGREEN.
SUCTION PRODUCING MACHINE.
APPLICATION FILED MAR. 19, 1917.

1,250,492.

Patented Dec. 18, 1917.
3 SHEETS—SHEET 1.

Witnesses

Inventor
T. W. Nygreen
By C. A. Snow & Co.
Attorney

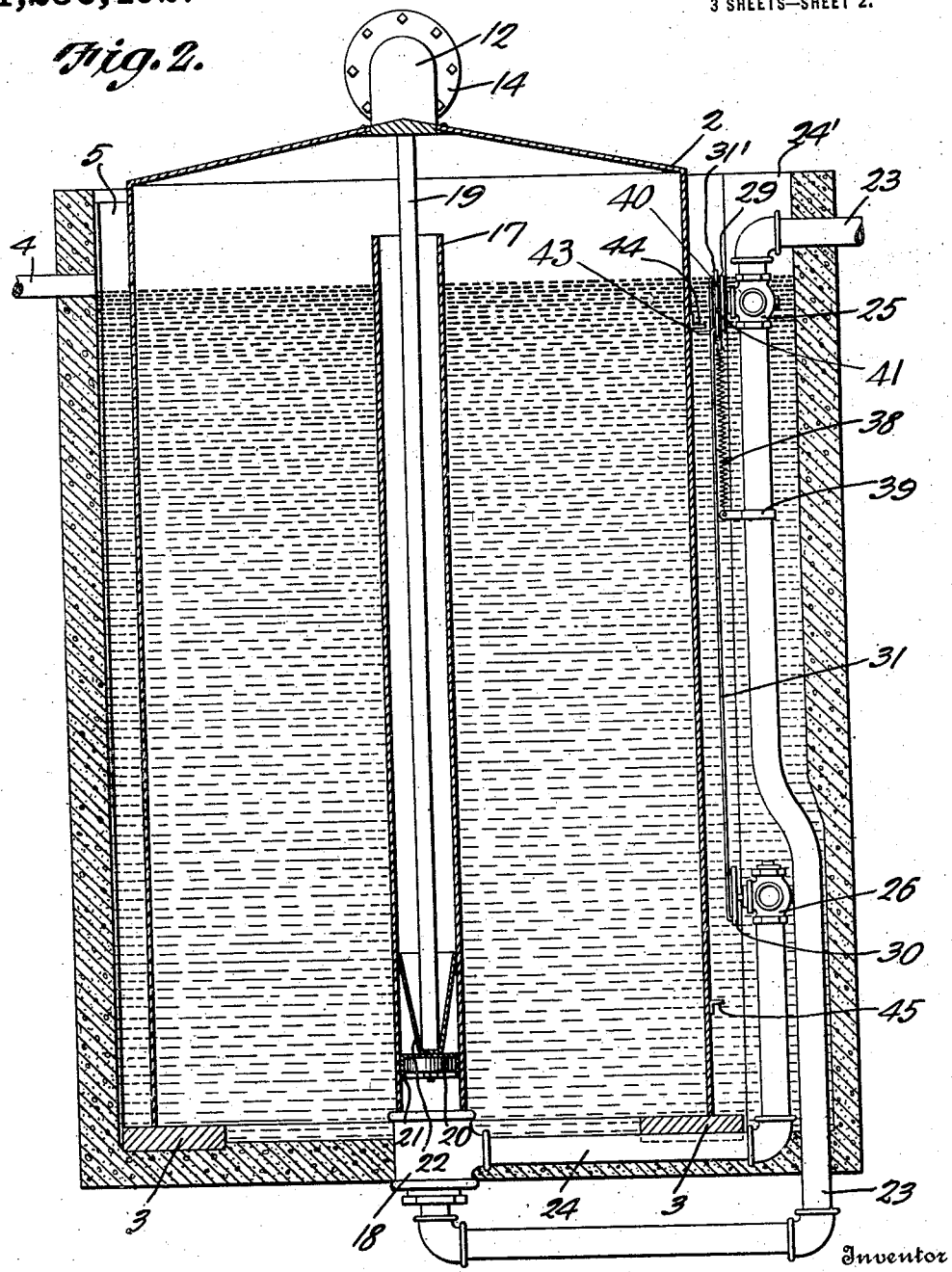

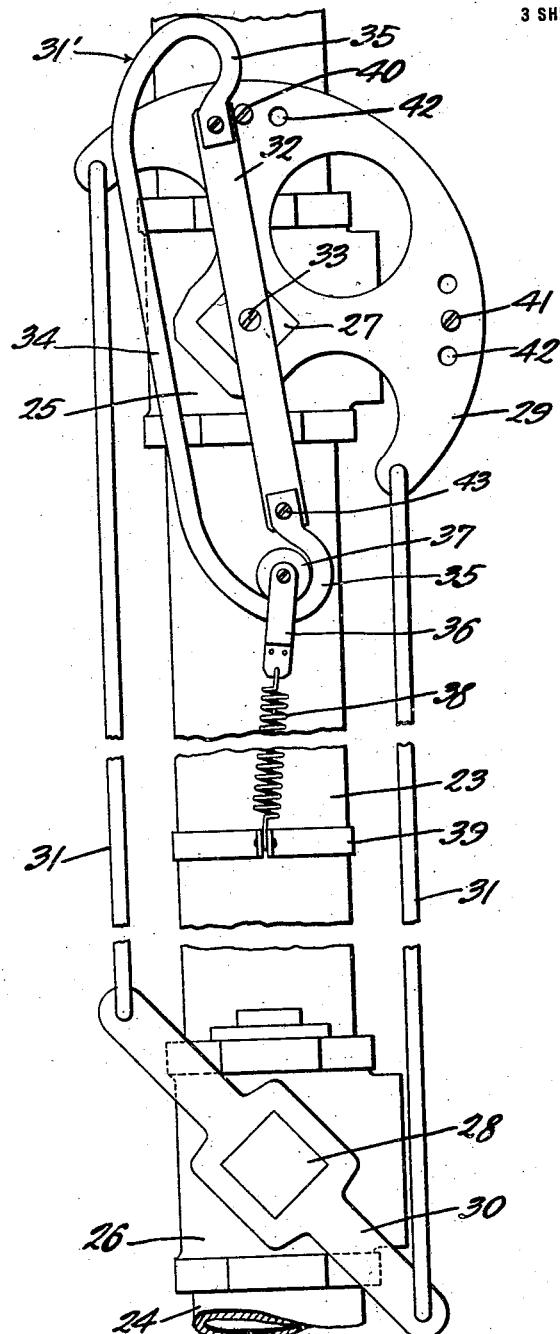

UNITED STATES PATENT OFFICE.

THEODORE W. NYGREEN, OF BELLINGHAM, WASHINGTON, ASSIGNOR TO LON BARRON, OF BELLINGHAM, WASHINGTON.

SUCTION-PRODUCING MACHINE.

1,250,492.  Specification of Letters Patent. Patented Dec. 18, 1917.

Application filed March 19, 1917. Serial No. 155,963.

*To all whom it may concern:*

Be it known that I, THEODORE W. NYGREEN, a citizen of the United States, residing at Bellingham, in the county of Whatcom and State of Washington, have invented a new and useful Suction-Producing Machine, of which the following is a specification.

The present invention appertains to suction producing machines, and aims to provide a novel and improved machine for creating suction.

It is the object of the invention to provide a suction producing machine of the gasometer type, the same being provided with a bell working within a tank, and novel means operable for raising and lowering the bell.

Another object of the invention is the provision of bell-actuating means utilizing water for forcibly raising the bell to create the suction, and means for discharging the water into the tank, to provide a circulation of the water therein intermittently, the flow of water being controlled automatically when the bell is raised and lowered.

A still further object of the invention is the provision of novel means for automatically reversing the water controlling valves by the movement of the bell.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawings, wherein:—

Fig. 2 is a vertical section taken on the line 2—2 of Fig. 1.

Fig. 4 is an enlarged elevation of the valve operating device, portions being broken away.

Figure 1:
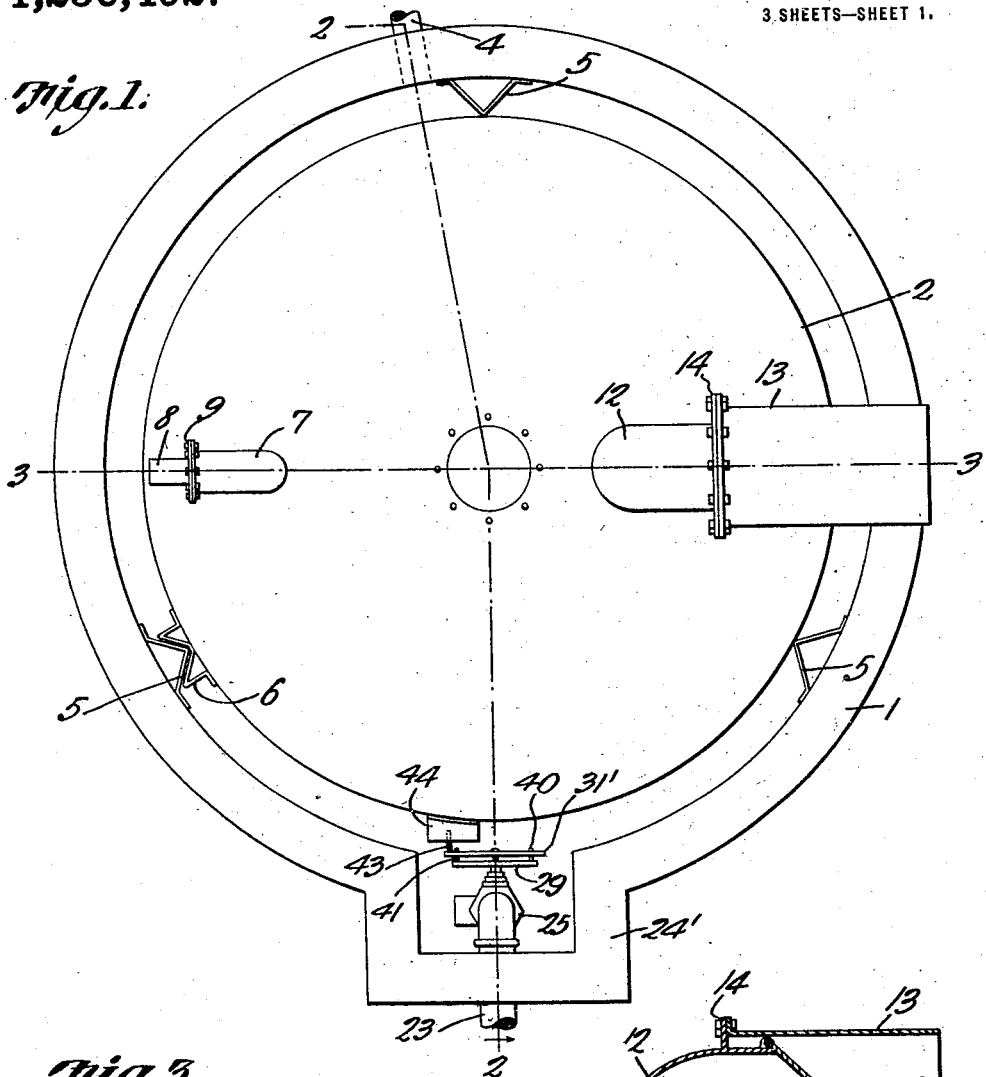
Figure 1 is a plan view of the improved suction cleaning machine.
Figure 3:
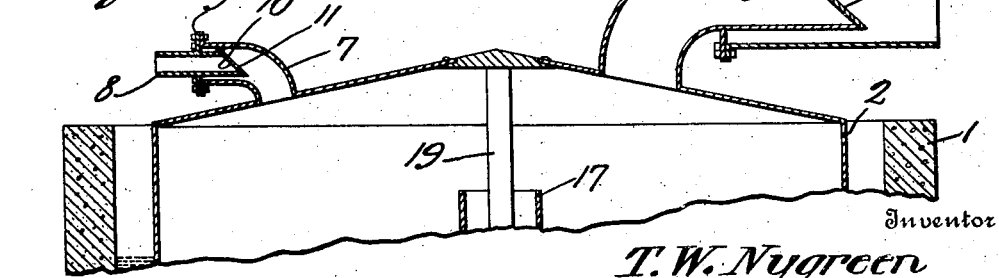
Fig. 3 is a fragmental vertical section taken on the line 3—3 of Fig. 1.

The apparatus embodies a tank 1, which may be of concrete or other suitable material, and which can be laid in the ground. This tank holds water and a bell 2 of sheet metal or other suitable material is movable vertically within the tank, the upper end of the tank being open, while the lower end of the bell is open, in the form of a gasometer. The top of the bell is preferably conical, and blocks 3 of wood or other suitable material are placed upon the bottom of the tank for supporting the bell when it gravitates to its lowermost or idle position. The tank 1 has an overflow 4 for the outlet of water at a level slightly below the upper end of the tank. Vertical guides 5 are secured to the walls of the tank for guiding the bell for vertical movement and holding it centrally within the tank, and the bell is provided with members 6 engaging one guide 5 to prevent the bell from rotating.

The top of the bell is provided with means for the inlet and outlet of air. The air inlet means embodies an elbow 7 attached to the top of the tank, and into the end of which the air inlet pipe or nozzle 8 extends, an annular flange or collar 9 being carried by the nozzle 8 and being bolted or otherwise fastened to the end of the elbow 7. The end of the nozzle within the elbow is provided with an inclined valve seat 10 and a flap valve 11 is hinged to the nozzle to seat downwardly against the seat for preventing the escape of air from the valve through the nozzle 8, said valve swinging open when the air enters the valve through said nozzle. The hose or other air conductor is connected to the nozzle 8 for conducting the air into the valve, the suction extending from the bell through the nozzle 8 when the bell is raised, it being noted that said bell is partially submerged in the water. The air outlet means embodies an elbow 12 attached to the top of the bell, and preferably larger than the elbow 7, the end of the elbow 12 projecting within an air outlet nozzle 13. A flange or collar 14 upon the elbow 12 is bolted or otherwise fastened to the end of the nozzle 13, and the end of the elbow is provided with an inclined valve seat 15 within the pipe 13 against which a flap valve 16 is seatable downwardly, said valve being hinged to the end of the elbow. The valve 16 swings open to permit the air to be forced through the elbow 12, but seats to prevent the air from flowing into the bell through said elbow 12. The dust collecting bag or other air receiving means is connected to the nozzle or pipe 13.

The means for raising the bell, embodies an elongated upstanding cylinder 17 centrally within the tank, and connected at its lower end to a T-fitting 18 which is preferably embedded in the bottom of the tank. A vertical plunger rod 19 which is movable within the cylinder 17 has its upper end secured in any suitable manner to the top of the tank. A plunger or piston 20 is movable vertically within the cylinder 17 and has a leather packing cup 21 to prevent leakage. Said plunger is also provided with an upstanding tapered or conical cup 22, the rim of which bears against the cylinder 17 above the plunger, to guide said plunger for vertical movement, and to prevent the same from tilting out of place. The rod 19 is seatable in the cup 22, and the plunger is preferably disconnected from the rod 19. A water supply pipe 23 has its discharge end extending upwardly through the fitting 18 into the lower end of the cylinder 17, and a water discharge pipe 24 is connected to the fitting 18 to receive water from the lower end of the cylinder, the discharge pipe 24 terminating a short distance above the bottom of the tank. The tank is provided at one side with an outwardly offset portion 24′ providing a recess for accommodating the vertical portions of the pipes 23 and 24 and the automatic valve operating device described hereinafter. The water supply pipe 23 projects upwardly to a point near the top of the tank, and then extends outwardly through the wall of the tank for connection with a water main or other source of water under pressure. The flow of water through the pipe 23 is controlled by a three-way valve 25 disposed therein near the upper end of the tank, and the discharge of water from the pipe 24 is controlled by a valve 26 connected to the discharge end thereof, the two valves being spaced vertically within the offset portion 24′ of the tank.

The valve controlling device is operable for automatically reversing the valve members 27 and 28 of the respective valves 25 and 26. Thus, a lever 29 formed from a plate is secured between its ends to the valve member 27, and a lever 30 is secured between its ends to the valve member 28, and the arms of the levers are connected by rods or links 31, whereby the levers are parallel and are moved simultaneously. With the levers arranged as shown in Fig. 4, the valve 25 is opened for the inflow of water and the valve 26 is closed, and when the levers are reversed, by swinging them counter clockwise, as seen in said figure, the valve 25 will shut off the inflow of water and the valve 26 will be opened. A slotted lever 31′ is employed for reversing the lever 29, and thereby reversing the valves. The lever 31′ embodies a longitudinal bar 32 pivoted between its ends, as at 33, to the valve member 27, and said lever also includes a rod 34 whose intermediate portion is parallel with the bar 32, the end portions of the rod 34 being of hooked form, as at 35, and secured to the ends of the bar 32, thereby providing a slot between the bar 32 and the bar 34. A member 36 is provided with a pulley or roller 37 rolling along the rod 34 within the slot of the lever 31′, and the member 36 is connected by a coiled wire retractile spring 38 with a band 39 clamped upon the pipe 23 below the valve 25, thereby tending to pull the member 36 and its roller 37 downwardly. Contact bolts or pins 40 and 41 are carried by the two arms of the lever 29, said pins preferably being adjustable in apertures 42, and said pins being arranged to be engaged by the two arms of the rocking lever 31′. The right hand arm of the lever 31′, as seen in Fig. 4, has an outstanding bolt or pin 43, which may be a securing element between the respective ends of the bar 32 and rod 34, and the pin 43 projects toward the bell in the path of movement of outstanding tappet members 44 and 45 carried by the bell near the upper and lower ends thereof.

The operation is as follows: Supposing that the bell 2 has gravitated, so that the member 44 seats upon and depresses the pin 43, thereby moving the corresponding arm of the lever 31′ downwardly, whereby the other arm of said lever strikes the pin 40 and swings the levers 29 and 30 to the position seen in Fig. 4, the valve 25 will therefore be opened while the valve 26 is closed. Water will therefore flow through the supply pipe 23 into the lower end of the cylinder 17, thereby raising the plunger 20 which in bearing upwardly against the lower end of the rod 19 will forcibly raise the bell. This will create a partial vacuum within the bell, thereby sucking air into the bell from the nozzle 8, the valve 11 swinging open by suction, while the valve 16 is seated. This suction continues during the upward movement of the bell, and when the member 45 reaches the depressed pin 43, the further upward movement of the bell will raise said pin, thereby swinging the corresponding arm of the lever 31′ upwardly, and when said lever is moved slightly past the horizontal position, with said arm raised slightly above the other arm, the roller 37 will move from the right hand end of the lever 31′, as seen in Fig. 4, to the left hand end or arm thereof, thereby completing the turning movement of the lever 31′ by a quick motion. It will be noted that when the right hand arm of the lever is raised, the spring 38 will be stretched, so that when the roller 37 moves to the left hand end of the lever 31′, said left hand end will be moved downwardly by a sharp movement, so that the right hand arm of the lever will strike the pin 41 and kick the lever 29 counter-clockwise to its opposite position. This will open the valve 26, and cause the valve 25 to shut off the inflow of water. The flow of water through the pipe 23 into the cylinder 17 is therefore stopped, and the valves 25 and 26 being opened into the tank permits the water to flow from the cylinder 17 through the pipes 23 and 24 into the tank. The plunger 20 is therefore moved downwardly under the weight of the bell, the bell gravitating and the air within the bell being expelled through the elbow 12. The valve 16 is forced opened by the air pressure during the gravitation of the bell, while the valve 11 will be seated by the air pressure. When the bell reaches its lowermost position, the member 44 will strike the raised pin 43, and depress the same, thereby swinging the lever 31' clockwise, as seen in Fig. 4, and when said lever is moved slightly beyond a horizontal position, the roller 37 will move to the right hand end of the lever, whereby the spring 38 will complete the movement of the lever 31' quickly, so that the left hand arm thereof strikes the pin 40 and swings the lever 29 to the position seen in Fig. 4, thereby again opening the valve 25 for the inflow of water and closing the valve 26. Thus, the bell starts the movement of the lever 31' in both directions, and said movement is completed quickly by the influence of the spring 38, to assure of the valves being reversed. The lever 31' has a limited oscillatory movement relative to the lever 29, whereby the lever 31' can be moved against the tension of the spring by the bell, after which the spring serves to complete the movement of the lever 31', to move the lever 29 with it. The water is discharged from the pipe 24 into the tank, thereby providing a circulation of the water therein, the spent water being used for supplying the tank, and the water overflowing at the top through the overflow outlet 4.

Having thus described the invention, what is claimed as new is:—

1. A suction producing machine embodying a water tank, a bell movable vertically therein having an air inlet and outlet, means for moving the tank vertically, an oscillatory lever for reversing said means, a second oscillatory lever having a limited movement relative to the aforesaid lever, spring means slidably connected with the second mentioned lever and movable past the pivot thereof for completing its movement in either direction, and coöperable means carried by the bell and second mentioned lever for starting the movement of the second mentioned lever in the proper direction when the bell is raised and lowered a certain amount.

2. A suction producing machine embodying a water tank, a bell movable vertically therein and having an air inlet and outlet, fluid operated means for raising the bell, reversible valve means for controlling the flow of fluid into and out of said means, a lever connected to the valve means for reversing it, a second lever pivoted between its ends, the two levers having coöperating means for limiting their oscillation relatively to one another, a member slidably engaging the second mentioned lever and movable past the pivot thereof, a spring connected to said member for completing the movement of the second mentioned lever in either direction, and coöperable means carried by the second mentioned lever and bell and operable for starting the movement of the second mentioned lever in the proper direction when the bell is raised and lowered a certain amount.

3. A suction producing machine embodying a water tank, a bell movable vertically therein and having an air inlet and outlet, and hydraulic means for moving the bell vertically, including a liquid inlet pipe, a valve controlling the admission of liquid through said pipe, a liquid discharge pipe, a valve controlling the discharge of liquid through said pipe, a separate lever connected to each valve at a median point of the lever, links connecting analogous arms of the levers, and a third lever operable to throw the first mentioned levers to actuate the valves, said third lever actuated by the rise and fall of the bell.

4. A suction producing machine embodying a water tank, a bell movable vertically therein and having an air inlet and outlet, a vertically disposed elongated cylindrical member centrally positioned within the tank, a plunger reciprocable within the cylindrical member, an inverted frusto-conical cup seated on the plunger, the rim of the cup contacting the inner walls of the cylinder, a plunger rod stepped in the cup and connected to the bell, and means for admitting liquid to and exhausting it from the cylinder to reciprocate the plunger.

In testimony that I claim the foregoing as my own, I have hereto affixed my signature in the presence of two witnesses.

THEODORE W. NYGREEN.

Witnesses:
H. I. OLIVER,
O. J. SCHWARTZ.

It is hereby certified that Letters Patent No. 1,250,492, granted December 18, 1917, upon the application of Theodore W. Nygreen, of Bellingham, Washington, for an improvement in "Suction-Producing Machines," were erroneously issued to Lon Barron as assignee of the entire interest in said invention, whereas said Letters Patent should have been issued to the *inventor, said Nygreen and Lon Barron, jointly*, said Barron being owner of *one-half* interest only, as shown by the records of assignments in this office; and that the said Letters Patent should be read with this correction therein that the same may conform to the record of the case in the Patent Office.

Signed and sealed this 12th day of February, A. D., 1918.

[SEAL.]

J. T. NEWTON,

*Commissioner of Patents.*

Cl. 230—17.